US010767794B2

(12) United States Patent
Cowham et al.

(10) Patent No.: US 10,767,794 B2
(45) Date of Patent: Sep. 8, 2020

(54) CLAMP

(71) Applicant: Pridgeon & Clay, Inc., Grand Rapids, MI (US)

(72) Inventors: Gregory S. Cowham, Alto, MI (US); Michael D. Kozal, Caledonia, MI (US); Mathews Goveas, Grand Rapids, MI (US); Daniel J. Bostwick, Grandville, MI (US); Pete R. Wojtas, Grand Rapids, MI (US); William Kanouse, Grand Rapids, MI (US); Brent Piselli, Grand Rapids, MI (US)

(73) Assignee: Pridgeon & Clay, Inc., Grand Rapids, MI (US)

( * ) Notice: Subject to any disclaimer, the term of this patent is extended or adjusted under 35 U.S.C. 154(b) by 326 days.

(21) Appl. No.: 15/812,386

(22) Filed: Nov. 14, 2017

(65) Prior Publication Data

US 2019/0145558 A1 May 16, 2019

(51) Int. Cl.
*F16L 21/06* (2006.01)
*F16L 33/04* (2006.01)
*F01N 13/18* (2010.01)

(52) U.S. Cl.
CPC ........ *F16L 21/065* (2013.01); *F01N 13/1805* (2013.01); *F01N 13/1827* (2013.01); *F01N 13/1855* (2013.01); *F16L 33/04* (2013.01); *F01N 2260/26* (2013.01); *F01N 2450/18* (2013.01); *F01N 2450/24* (2013.01); *Y10T 24/1441* (2015.01)

(58) Field of Classification Search
CPC ..... F16L 21/065; F16L 33/04; F01N 13/1805; F01N 13/1855; F01N 13/1827; Y10T 24/1441

USPC ................. 285/279, 419, 420, 421
See application file for complete search history.

(56) References Cited

U.S. PATENT DOCUMENTS

| 3,510,918 A | 5/1970 | Oetiker |
| 4,165,109 A * | 8/1979 | Foti ..................... F01N 13/1805 285/420 |
| 4,312,526 A * | 1/1982 | Cassel .................. F16L 21/065 285/419 |
| 7,231,694 B2 | 6/2007 | Ignaczak |
| 2003/0015872 A1* | 1/2003 | Potts ..................... F16L 21/065 285/420 |
| 2004/0216284 A1 | 11/2004 | Belisle |
| 2004/0261227 A1 | 12/2004 | Cassel |
| 2005/0039306 A1 | 2/2005 | Logan |
| 2005/0099001 A1* | 5/2005 | Cassel ................. F01N 13/1805 285/23 |
| 2006/0175837 A1* | 8/2006 | Ignaczak ............... F16L 21/065 285/420 |
| 2007/0022578 A1 | 2/2007 | Crockett |

FOREIGN PATENT DOCUMENTS

WO     8002317 A1     10/1980

* cited by examiner

*Primary Examiner* — Zachary T Dragicevich
(74) *Attorney, Agent, or Firm* — McGarry Bair PC

(57) ABSTRACT

A clamp for use in joining conduit segments comprising a ring sector and a radially projecting channel sector having first and second straps, first and second compression members, a central compression member, and a fastener wherein upon tightening the fastener, axial forces along the fastener are transferred into clamping forces around the clamp in order to seal the conduit segments.

12 Claims, 14 Drawing Sheets

CLAMP

BACKGROUND OF THE INVENTION

The present invention relates to a clamp for use in joining tubular members. Band clamps are commonly used for connecting pipes, hoses, and other tubular members together, such as exhaust pipes of an automotive exhaust system. Such connections may be in a telescopic overlap joint or in an end-to-end butt joint of two tubular members. To be effective, the connection between the tubular members should provide a suitable fluid-tight seal to prevent leakage. The connection should also have a high degree of mechanical strength and be capable of easy disassembly.

BRIEF DESCRIPTION OF THE INVENTION

In one aspect, the disclosure relates to a clamp for compressing a junction of a first conduit and a second conduit to seal the junction, the clamp including a ring sector and a radially projecting channel sector, the radially projecting channel sector having first and second straps, each of the first and second straps extending outwardly from the ring sector at an angle defining a pinch point, and defining a proximal gap between the pinch points less than a distal gap between ends of the first and second straps, a U-shaped spacer between the first and second straps and having a first arm and a second arm extending from a web, wherein the web includes an embossment, and wherein the second arm extends from the web further than the first arm, first and second compression members adjacent to and opposite the first and second straps from the U-shaped spacer and having a portion thereof disposed at a pinch point, each of the first and second compression members, the first and second straps, and the U-shaped spacer having an aperture in registry with each other, a bolt extending through the apertures and having a head bearing against one of the first and second compression members, and a nut on the bolt and bearing against the other of the first and second compression members. When the nut is tightened on the bolt with the ring sector around a junction of a first outer conduit and a second conduit, the first and second compression members will urge the pinch points toward each other thereby drawing the ring sector around the first and second conduits in compression.

In another aspect, the disclosure relates to a clamp for compressing a junction of a first conduit and a second conduit to seal the junction, the clamp including a ring sector and a radially projecting channel sector, the radially projecting channel sector having first and second straps, each of the first and second straps extending outwardly from the ring sector at an angle defining a pinch point, and defining a proximal gap between the pinch points less than a distal gap between ends of the first and second straps, a wedge shaped spacer between the first and second straps, the wedge shaped spacer having a first arm and a second arm, wherein the second arm extends further than the first arm, first and second compression members adjacent to and opposite the first and second straps from the wedge shaped spacer, each compression member having a tab with a first knuckle and an overlapping ear with a second knuckle, the first and second knuckles at least partially aligned, and each ear having a portion thereof disposed at a pinch point, each of the first and second compression members, the first and second straps, and the wedge shaped spacer having an aperture in registry with each other, a bolt extending through the apertures and having a head bearing against one of the first and second compression members, and a nut on the bolt and bearing against the other of the first and second compression members. When the nut is tightened on the bolt with the ring sector around a junction of a first outer conduit and a second conduit, the first and second compression members will be drawn toward each other such that the drawing of the first knuckle toward the second knuckle urges the pinch points toward each other thereby drawing the ring sector around the first and second conduits in compression

DETAILED DESCRIPTION OF THE DRAWINGS

Figure 1:
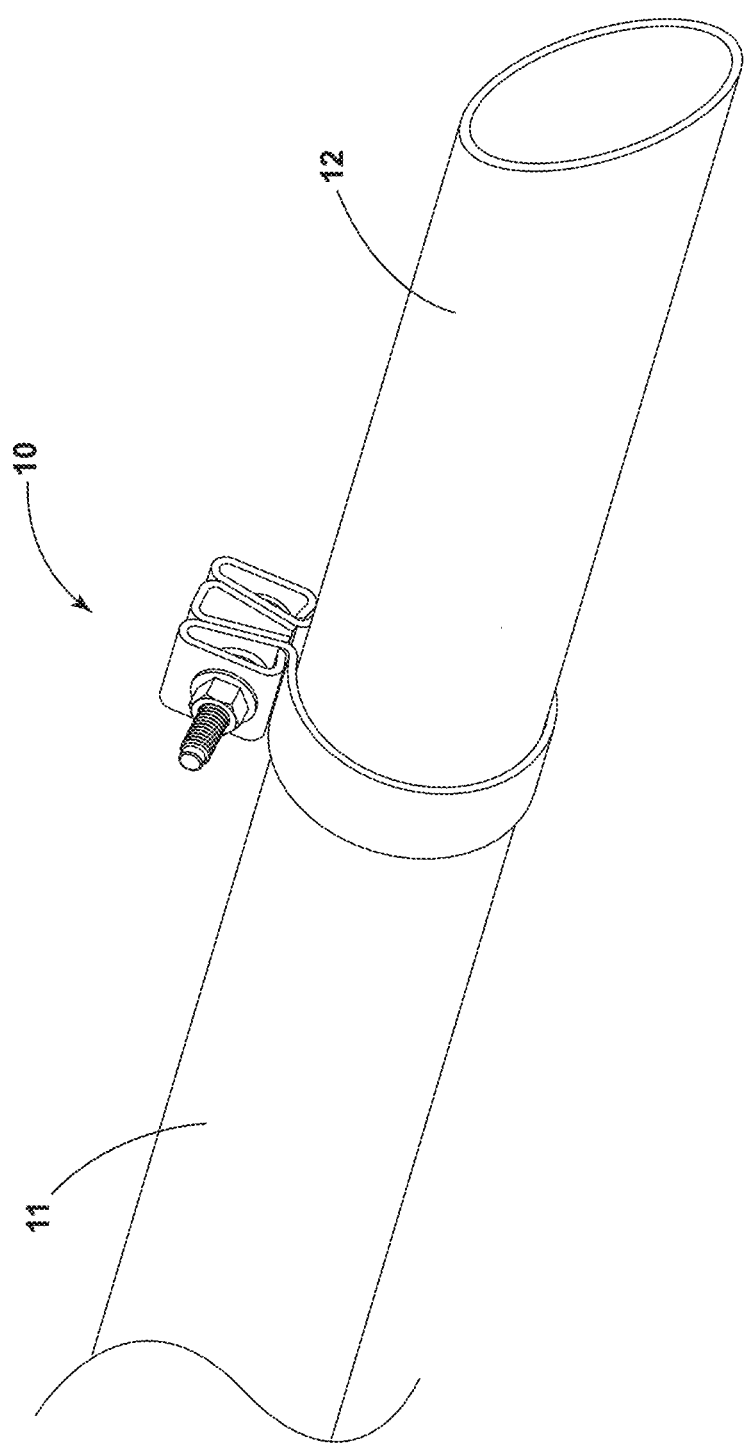
FIG. 1 is an isometric view of a clamp joining two pipes in accordance with aspects described herein.

In FIG. 1, a first embodiment of a clamp 10 according to the invention may be used to form a joint between a first pipe end 11 and a second pipe end 12. The clamp 10 and pipe ends 11, 12 can comprise a portion of a larger assembly, such as a vehicle exhaust system comprising an exhaust manifold, a muffler, a tailpipe, and other components which are not germane to the invention and are not shown in the drawings. The clamp 10 is seated over the joint between the pipe ends 11, 12. In one example the joint could be a telescopic overlap joint, in which case the first pipe end 11 could be a male pipe end and the second pipe end 12 could be a female pipe end. In another example the pipe ends 11, 12 could be joined using a butt joint. Aspects of the disclosure can be included wherein a third pipe can be disposed, positioned, telescoped, or the like, within at least one of the first or second pipe ends 11, 12.

Figure 2:
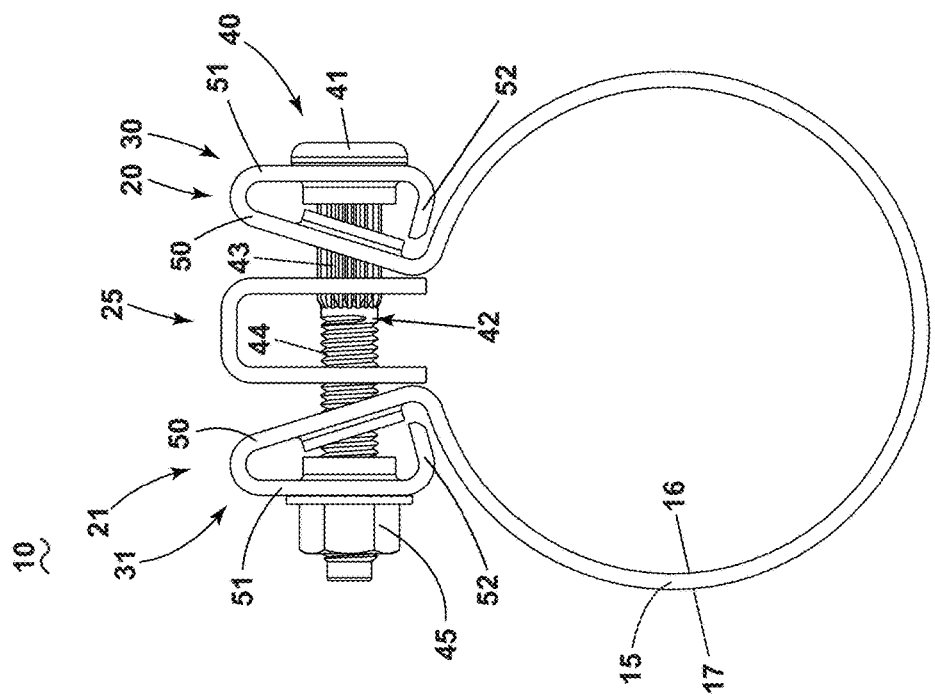
FIG. 2 is a side view of the clamp of FIG. 1 in its open state, in accordance with aspects described herein.

Referring now to FIG. 2, the clamp 10 comprises a ring sector and a radially projecting channel sector. The ring sector comprises a clamp ring 15 having an interior surface 16 and exterior surface 17 while the channel sector comprises a first strap 20, a second strap 21, a wedge shaped spacer 25 positioned between the first and second straps 20, 21, a first compression member 30, a second compression member 31, a bolt 40, and a nut 45. Each of the first and second straps 20, 21 comprises a tab 50 and an ear 51. Each of the first and second compression members 30, 31 can be extensions of the first and second straps 20, 21 formed in a generally triangular shape having three sides wherein an end of a third side forms an abutment end 52 that contacts a first side.

Figure 3:
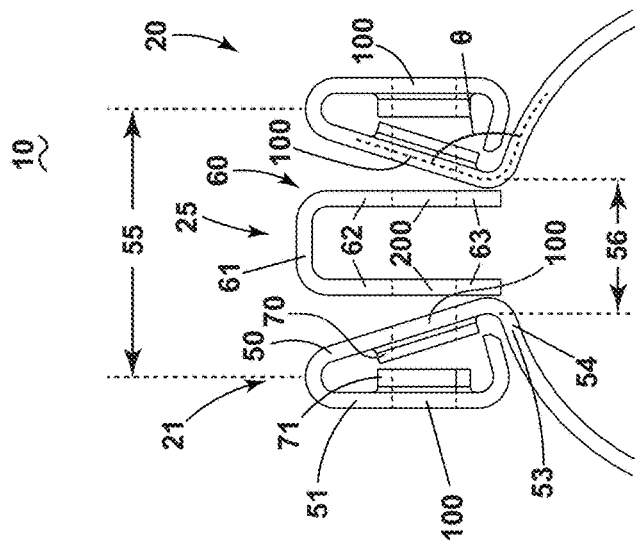
FIG. 3 is a side view of a radially projecting channel sector of the clamp of FIG. 1, in accordance with aspects described herein.

Turning to FIG. 3, the tab 50 of each strap 20, 21 extends outwardly from the clamp ring 15 at an angle θ defining a pinch point 53 at a curved transition 54 between the clamp ring 15 and either of the first or second straps 20, 21. A distal gap 55 is formed between each ear 51, a proximal gap 56 is formed between the two pinch points 53, and the proximal gap 56 is smaller than the distal gap 55. The wedge shaped spacer 25 comprising a U-shaped spring 60 having a web 61, arms 62, and ends 63 is positioned with its ends 63 adjacent the curved transitions 54. Further, apertures 100 in each of the first and second straps 20, 21 are formed with a tab skirt 70 and ear skirt 71 that each begin on the ear 51 or tab 50 and extend into the interior volume bounded by the ear 51 and tab 50. Additional apertures 200 can be formed through the arms 62 of the U-shaped spring, and the apertures 100, 200 can be in registry with each other for the slidable receipt of a fastener such as the bolt 40. The apertures 100, 200 can also be keyed for engagement with the bolt 40.

It can be contemplated that in all embodiments, the bolt 40 comprises a head 41 and a shank 42 having a knurled portion 43 and a threaded portion 44 wherein the knurled portion 43 can contain at least one spline or a plurality of splines along its length, and the splines can be formed in a parallel or cross-hatched pattern as shown in FIG. 2. The diameter of the head 41 is larger than that of the shank 42, and the diameter of the shank 42 is smaller than that of any aperture described herein to allow for the slidable receipt of the bolt 40 through that aperture. It is preferred to make the diameter of the shank 42 as large as possible to allow for engagement between any aperture and either or both of the knurled portion 43 or threaded portion 44 while maintaining the ability of the bolt 40 to slide through that aperture. In addition, the length of the bolt can be greater than the width of the channel sector such that the nut 45 can be threaded onto the threaded portion 44 of the bolt 40 while the clamp 10 is in an open state.

Figure 4:
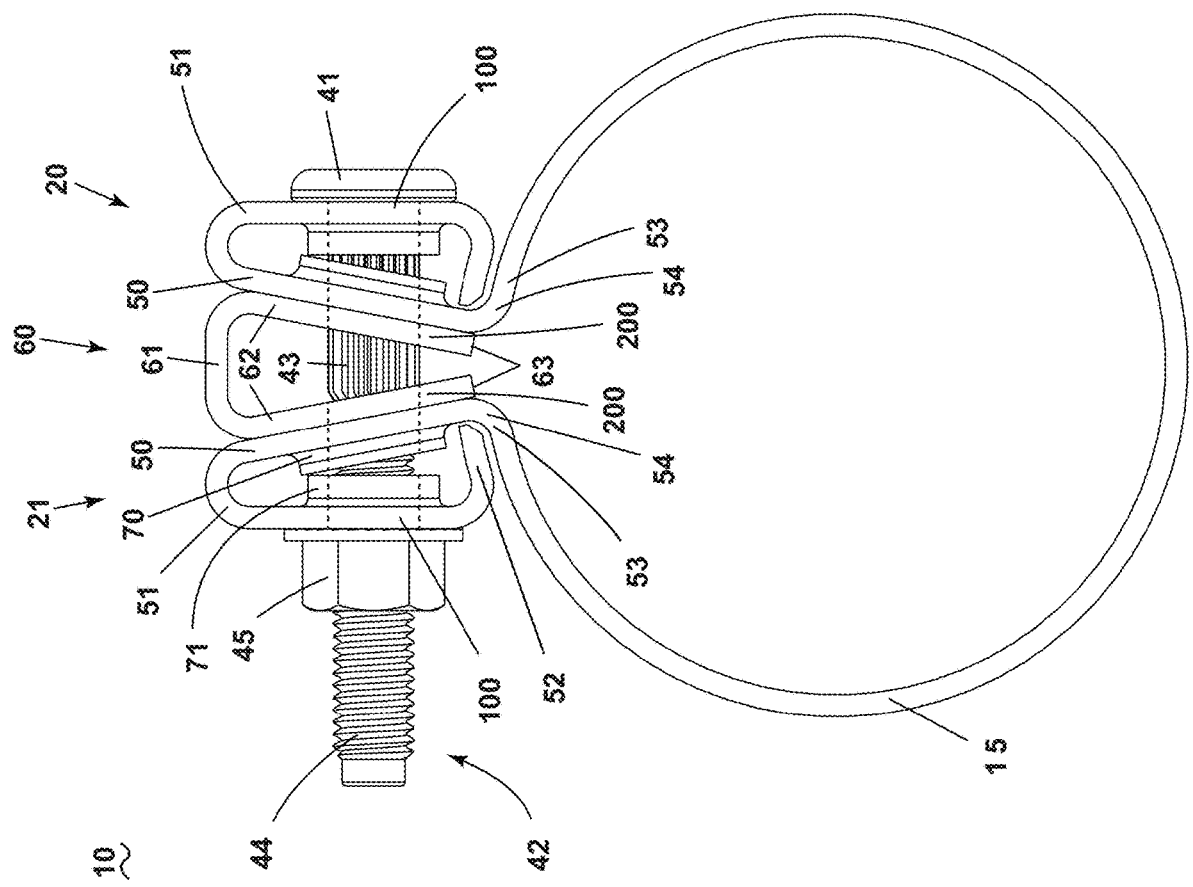
FIG. 4 is a side view of the clamp of FIG. 1 in its closed state, in accordance with aspects described herein.

In order to tighten the clamp 10 of FIG. 2, a relative torque is applied between the nut 45 and the bolt head 41 such that the nut is threaded further onto the bolt 40 as shown in FIG. 4. During the tightening process, the head 41 of the bolt 40 bears against the ear 51 of the first strap 20 while the nut 45 bears against the ear 51 of the second strap 21, causing the tabs 50 to compress the arms 62 of the U-shaped spring 60. In addition, each abutment end 52 can fit into the space between the tab skirt 70 and the clamp ring 15 at the curved transition 54 such that they aid in closing the clamp 10 at the pinch point 53. The knurled portion 43 of the bolt 40 can engage the arms 62 of the U-shaped spring 60 at the apertures 200, and can also engage at least one strap 20, 21 at the apertures 100, in order to prevent spinning between these members during the tightening process.

Once fully tightened, the abutment ends 52 can remain in contact with the curved transitions 54 adjacent the tab skirts 70. In addition, the tab skirt 70 and ear skirt 71 of each strap 20, 21 can come into contact in order to support each strap 20, 21 against collapse. Further, the web 61 of the U-shaped spring 60 can provide additional support for the straps 20, 21 against collapse, and a gap can be maintained between the ends 63 of the U-shaped spring 60.

It should be appreciated that for the purposes of this invention, "fully tightened" or "fully closed" can be understood to mean the clamp 10 has provided a clamping force sufficiently large so as to prevent the second pipe end 12 from moving with respect to the first pipe end 11 as well as to maintain a sealed interior environment such that materials moving through the pipes do not leak out of the pipes' interior volume at their junction.

Figure 6:
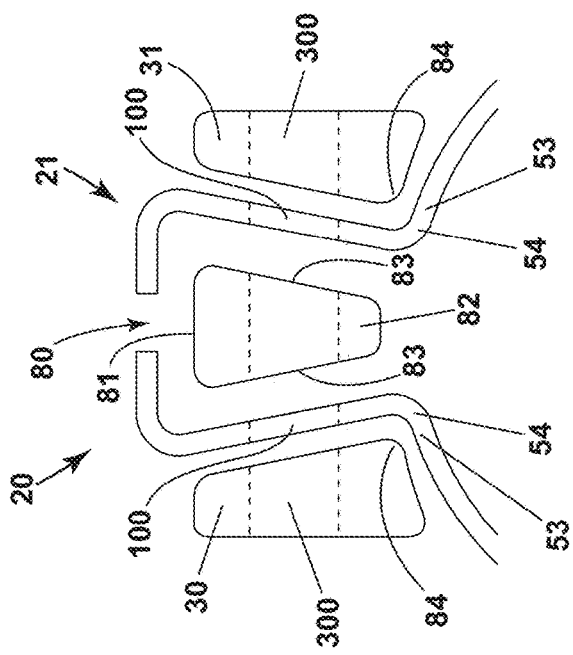
FIG. 6 is an exploded side view of a radially projecting channel sector of the clamp of FIG. 5, in accordance with aspects described herein.
Figure 5:
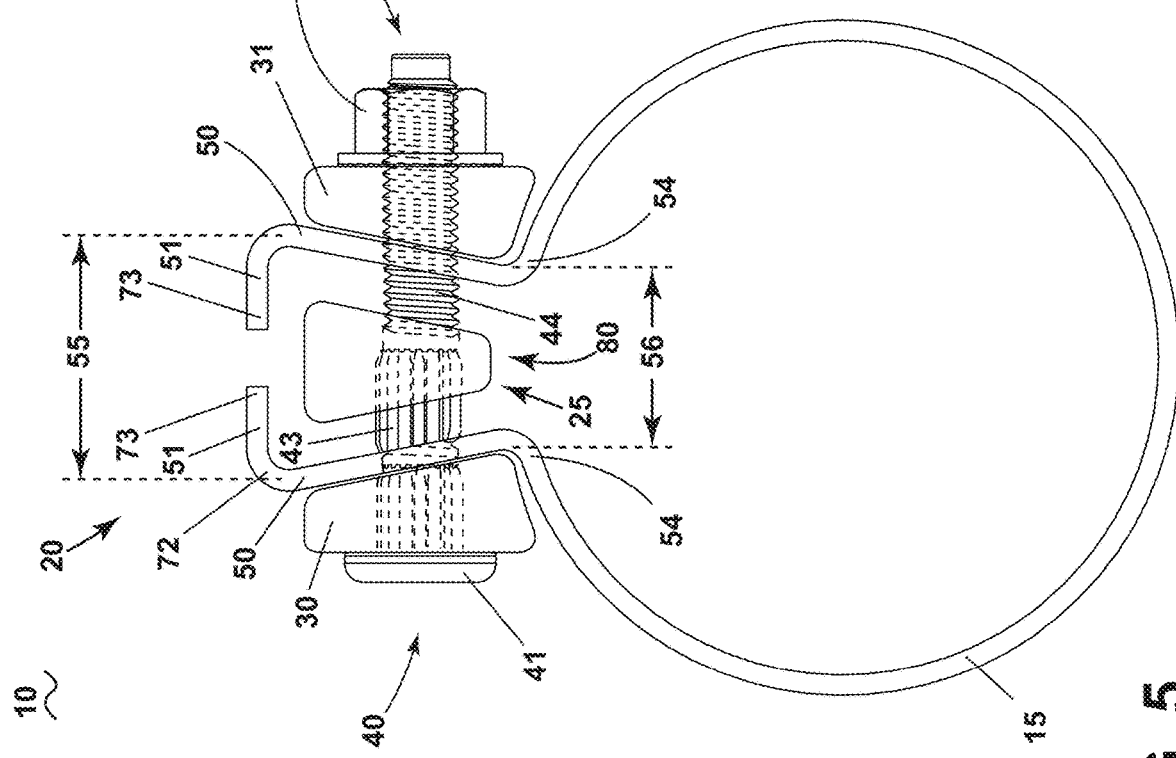
FIG. 5 is a side view of a clamp in its open state, in accordance with aspects described herein.

A second embodiment of the invention is shown in FIGS. 5 and 6. The first strap 20 and second strap 21 each comprise the tab 50 and ear 51 wherein a substantially perpendicular junction 72 exists between the tab 50 and ear 51 at a distal portion of the tab 50, and each ear has an end 73. The wedge shaped spacer 25 comprising a center wedge 80 is positioned between the first strap 20 and the second strap 21. The center wedge 80 comprises a distal face 81, proximal face 82, and two lateral faces 83 as shown in FIG. 6. The first and second compression members 30, 31 are positioned adjacent to each of the first and second straps 20, 21. The apertures 100 are formed through each of the first and second straps 20, 21, the aperture 200 is formed through the center wedge, and each of the first and second compression members 30, 31 has an aperture 300 through its width. All apertures 100, 200, 300 can be in registry with each other for the slidable receipt of a fastener such as the bolt 40, and can also be keyed for engagement with the threaded portion 44 or knurled portion 43 of the bolt 40. The bolt 40 is illustrated in FIG. 5 with its head 41 bearing against the first compression member 30. The nut 45 is illustrated in FIG. 5 as being threaded onto the bolt 40 and bearing against the second compression member 31. In addition, a curved transition 54 can exist at the junction of the clamp ring 15 and each tab 50 forming a pinch point 53, where the distal gap 55 is formed between each ear 51, the proximal gap 56 is formed between the two pinch points 53, and the proximal gap 56 is smaller than the distal gap 55. Further, a portion 84 of each compression member 30, 31 can be disposed at each pinch point 53 as shown in FIG. 6.

Figure 7:
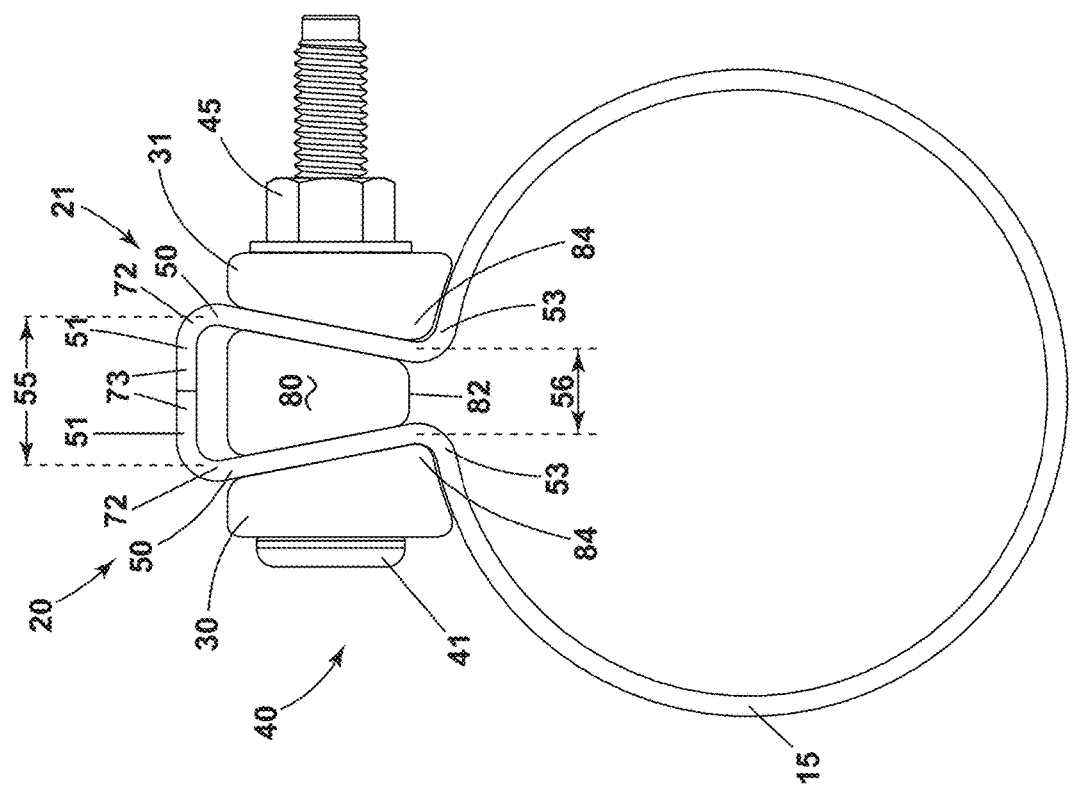
FIG. 7 is a side view of the clamp of FIG. 5 in its closed state, in accordance with aspects described herein.

FIG. 7 shows the clamp 10 of FIG. 5 in a fully closed state. In order to close the clamp 10, a relative torque is applied between the bolt head 41 and the nut 45 such that the nut 45 is further threaded along the bolt 40. During the tightening process, the head of the bolt 40 bears against the first compression member 30 which comes into contact with the first strap 20. At the same time, the nut 45 bears against the second compression member 31 which comes into contact with the second strap 21. Meanwhile, the center wedge 80 comes into contact with both the first strap 20 and the second strap 21. In addition, the portion 84 of each of the first and second compression members 30, 31 can bear against the clamp ring 15 at the pinch point 53 to aid in closing the clamp. Further, the ends 73 of the ears 51 may come into contact, and bending is possible at the junction 72 to allow for continued closing of the clamp 10 after the ends 73 come into contact. Once the clamp 10 is fully closed, the ends 73 may be in contact with each other or there may be a gap between them. Further, the minimum proximal gap 56 can be limited by the width of the proximal face 82 of the center wedge 80, while the minimum distal gap 55 can be limited by the width of the distal face 81 of the center wedge 80.

When compared with the prior art, the embodiment of the invention shown in FIGS. 5-7 is better able to transfer axial forces from the bolt 40 into clamping forces around the ring 15. During the tightening process, the portions 84 of the first and second compression members 30, 31 can bear against the pinch point 53 and aid in closing the clamp 10. As a result, less applied torque is required to bring the clamp 10 into a fully tightened position; in one example, data showed that the second embodiment of the clamp 10 was able to be closed with an applied torque of 30 N·m compared to a closing torque of 74 N·m for a prior art clamp. In addition, lowering the amount of applied torque can reduce the chance of a material failure occurring in the bolt 40, and this could allow for the use of less expensive materials in constructing the bolt 40. Once the clamp 10 is fully tightened, the portions 84 of the first and second compression members 30, 31 can reinforce the curved transition 54 and help concentrate clamping forces near the pipe surface.

Figure 8:
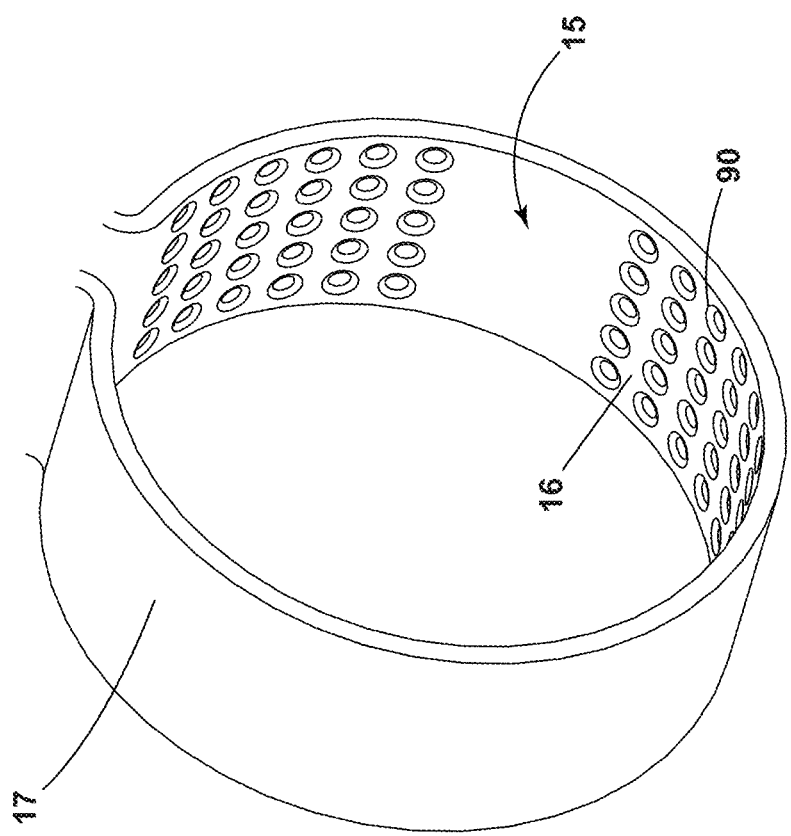
FIG. 8 is an isometric view of a clamp, in accordance with aspects described herein.

FIG. 8 shows a third embodiment of the invention wherein the clamp ring 15 having an interior surface 16 and exterior surface 17 can have at least one dimple 90 formed into the interior surface 16. It is also contemplated that a group of dimples 90 can uniformly cover a portion or all of the interior surface 16 of the ring 15.

Figure 9A:
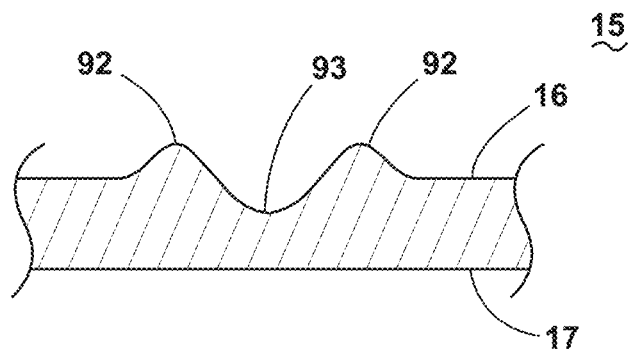
FIGS. 9A-9D are partial cross-sectional side views of a clamp ring in the clamp of FIG. 8, in accordance with aspects described herein.
Figure 9B:
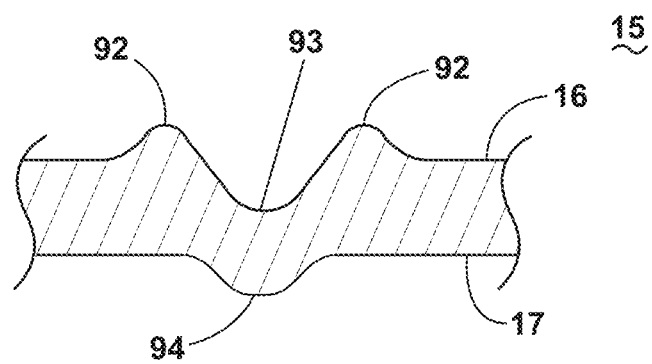
Figure 9C:
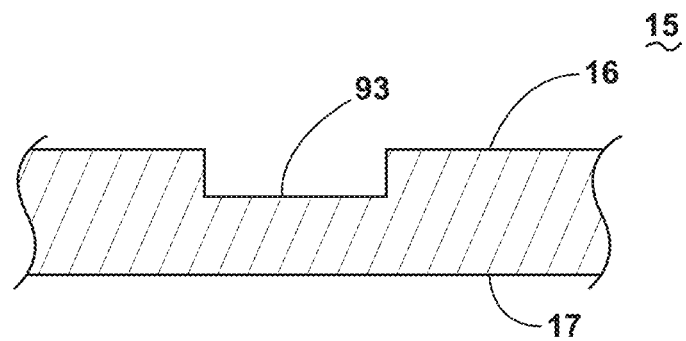
Figure 9D:
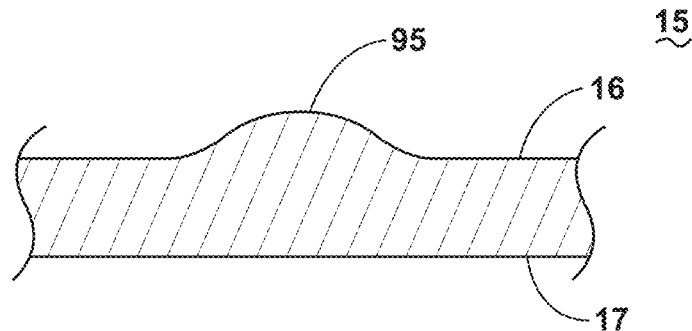

FIGS. 9A-9D illustrate possible options for the dimples 90 in the clamp ring 15 illustrated in FIG. 8. The dimple may extend into the interior clamp surface 16 creating a central low point 93 as shown in FIG. 6A. There may be an annular portion 92 that is taller than the interior surface 16 and surrounds the central low point 93 as shown in FIGS. 9A and 9B, and the dimple 90 may have a protrusion 94 extending out of the exterior clamp surface 17 (FIG. 9B). The central low point 93 can also be a flat surface parallel to the interior surface 16 and extending the full width of the dimple 90, as shown in FIG. 9C. The dimple 90 may also be formed as a central high point 95 extending out of the interior clamp surface 16 as shown in FIG. 9D.

The dimples 90 shown in FIGS. 8 and 9A-9D can have the effect of reducing the surface area of the clamp ring 15 in contact with the second pipe end 12. The reduced surface area contact could cause a reduction in frictional forces between the interior clamp ring surface 16 and the second pipe end 12; with less friction between these members, the applied torque required to fully tighten the clamp 10 can be further reduced. In addition, the dimples 90 can be formed in the clamp ring 15 of any embodiment in the current invention, or in any clamp in the prior art having a ring sector.

Figure 10A:
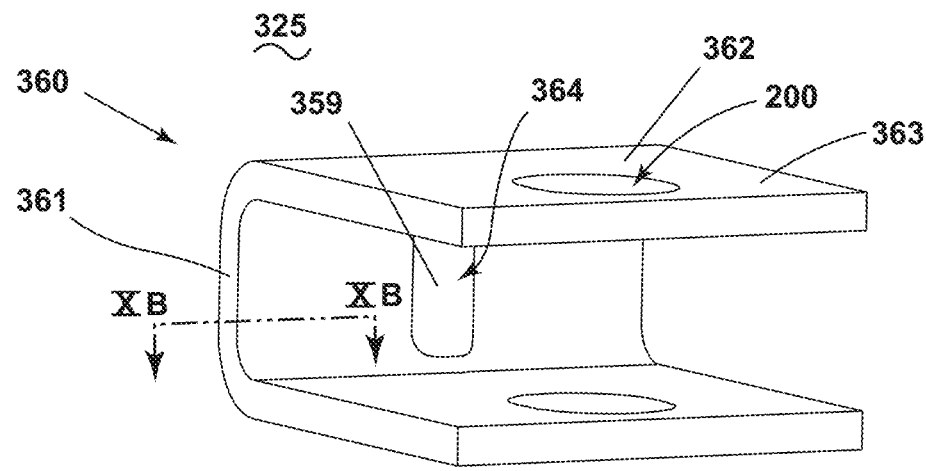
FIGS. 10A-10B are additional views of a U-shaped wedge, in accordance with aspects described herein.

FIG. 10A illustrates another wedge shaped spacer 325 according to another aspect of the present disclosure. The wedge shaped spacer 325 is similar to the wedge shaped spacer 25; therefore, like parts will be identified with like numerals increased by 300, with it being understood that the description of the like parts of the wedge shaped spacer 25 applies to the wedge shaped spacer 325, unless otherwise noted. One difference is that the wedge shaped spacer 325 includes a U-shaped spring 360 having an embossment 364 extending along the web 361. As illustrated, the embossment 364 can include a body 359 that extends toward the distal ends 363 of the U-shaped spring 360.

Figure 10B:
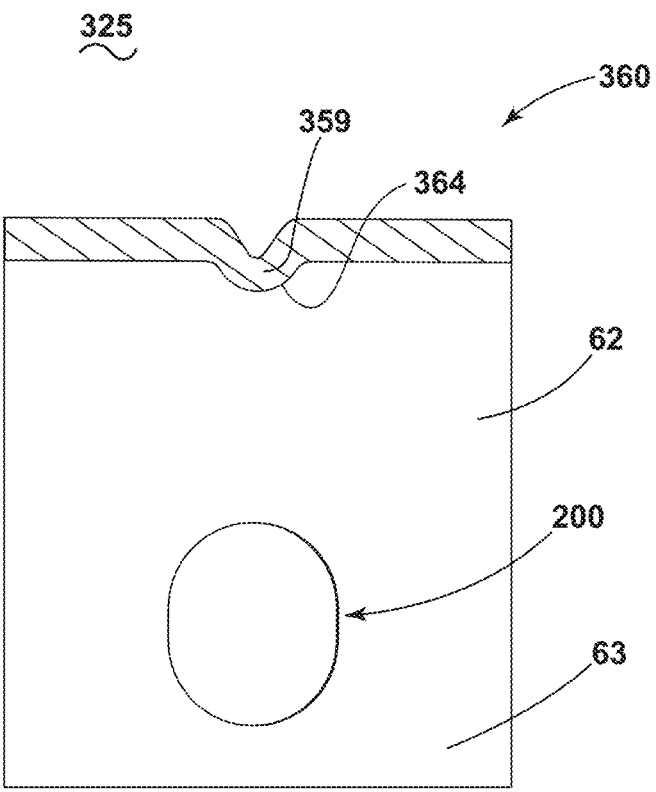

FIG. 10B illustrates a cross section of the wedge shaped spacer 325 taken along line XB of FIG. 10A. As shown, the embossment 364 can include or be formed, molded, machined, or the like, by way of a depression in the web 361. Aspects of the disclosure can be included wherein the embossment 364 extends along a portion of, or the full length of the web 361. The embossment 364 can be included to provide additional or increased structural support or rigidity along the web 361 of the U-shaped spring 360, that is, in the direction of the view of FIG. 10B.

Figure 11:
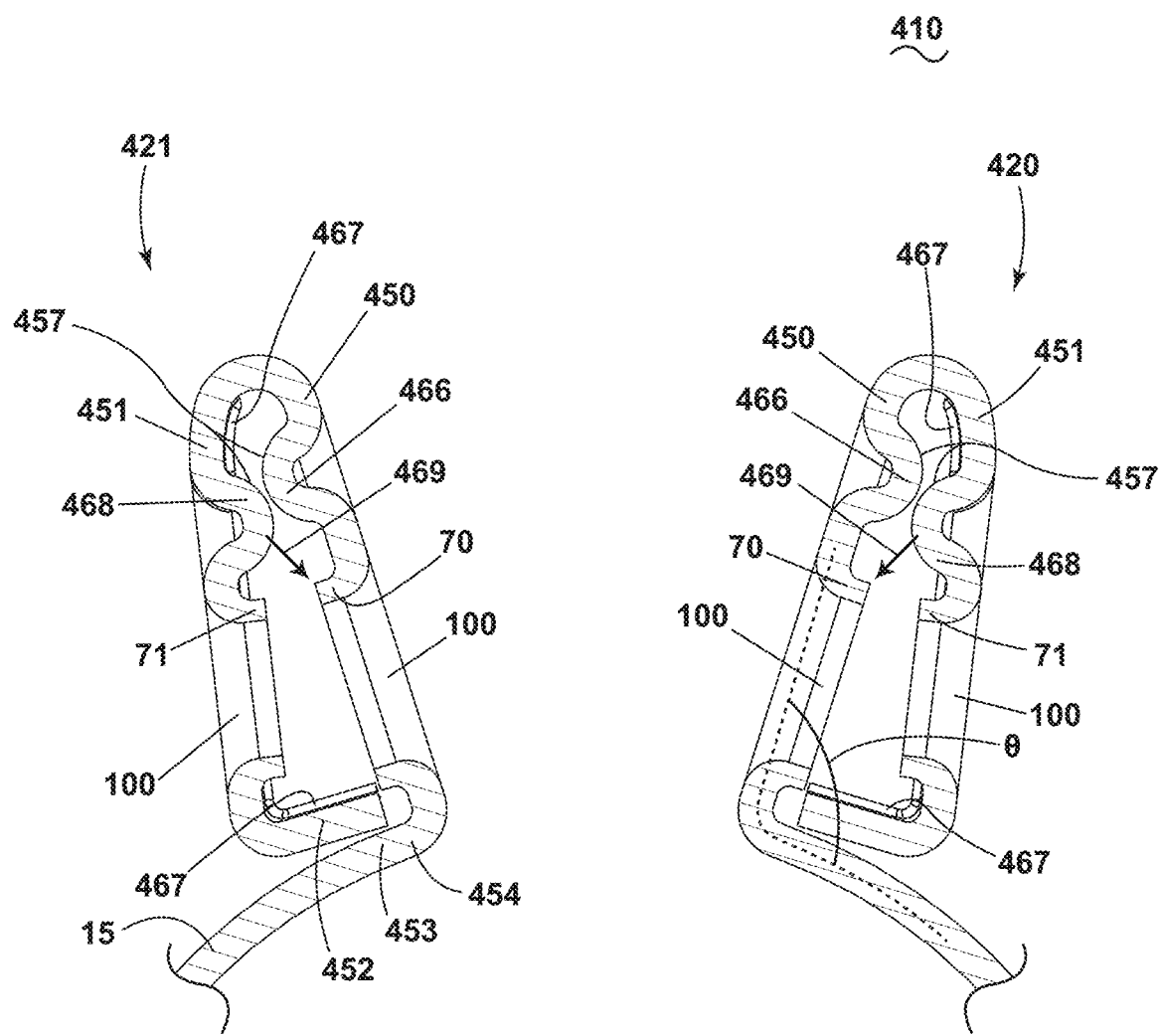
FIG. 11 is a zoomed cross-sectional view of another set of straps, in accordance with aspects described herein.

FIG. 11 illustrates another clamp 410 according to another aspect of the present disclosure. The wedge shaped clamp 410 is similar to the clamp 10; therefore, like parts will be identified with like numerals increased by 400, with it being understood that the description of the like parts of the clamp 10 applies to the clamp 410, unless otherwise noted. One difference is that the clamp 410 includes additional embossed aspects on each of the first and second straps 420, 421. In one non-limiting aspect, each first and second strap 420, 421 can include an embossment or first knuckle 466 in the tab 450 and an embossment or second knuckle 468 in the ear 451.

As shown, at least one of the first knuckle 466 or second knuckle 468 can include a substantially semi-spherical configuration or semi-circular cross section, wherein convex portions 457 extend toward each other. Substantially semi-spherical configurations, or semi-circular cross sections are merely one non-limiting example of contoured configurations of the respective first and second knuckles 466, 468, and additional configurations are envisioned. For instance, in another non-limiting aspect, at least one of the first or second knuckles 466, 468 can include a substantially flat interface knuckle, wherein the flat interface can be straight or angled relative to the opposing knuckle 466, 468. In another non-limiting aspect, one of the first or second knuckles 466, 468 can be dissimilar than the opposing knuckle 468, 466 (e.g. a flat knuckle 466 and a semi-spherical knuckle 468). Additional examples or combinations can be included. Each of the first knuckle 466 and second knuckle 468 can include or be formed, molded, machined, or the like, by way of a depression in the respective tab 450 and ear 451, and extend inwardly toward the opposing tab 450, ear 451, or knuckle 466, 468.

Also illustrated is that the first knuckle 466 is offset vertically relative to the second knuckle 468 (or vice versa). In one non-limiting aspect, the second knuckle 468 can be configured, arranged, disposed, or the like, lower (i.e. closer to the abutment ends 452, the pinch point 453, or the curved transition 454) relative to the first knuckle 466. Aspects of the disclosure can be included wherein the first knuckle 466 and the second knuckle 468 can otherwise be axially aligned, except for the second knuckle 468 lower relative to the first knuckle 466, as described.

Non-limiting aspects of the disclosure can also be included wherein at least a portion of the ear 451 can include embossments 467 along at least a portion of, or the entire length of, the ear 451. In one instance, embossments 467 can be disposed along the length of the ear 451 toward abutment end 452. The embossments 467 can extend inwardly from the base of the ear 451 toward the tab 450, or in the example of the abutment ends 452, extend away from the abutment end 452 toward the aperture 100. Further non-limiting aspects of the disclosure can be included wherein the abutment ends 452 also include embossments 467. In one non-limiting aspect, the embossments 467 can be similar to the embossments 364 of FIG. 10A, or the forming thereof. In another non-limiting aspect, the embossments 467 can be smaller or shallower depressions, compared with embossments 364.

Figure 12:
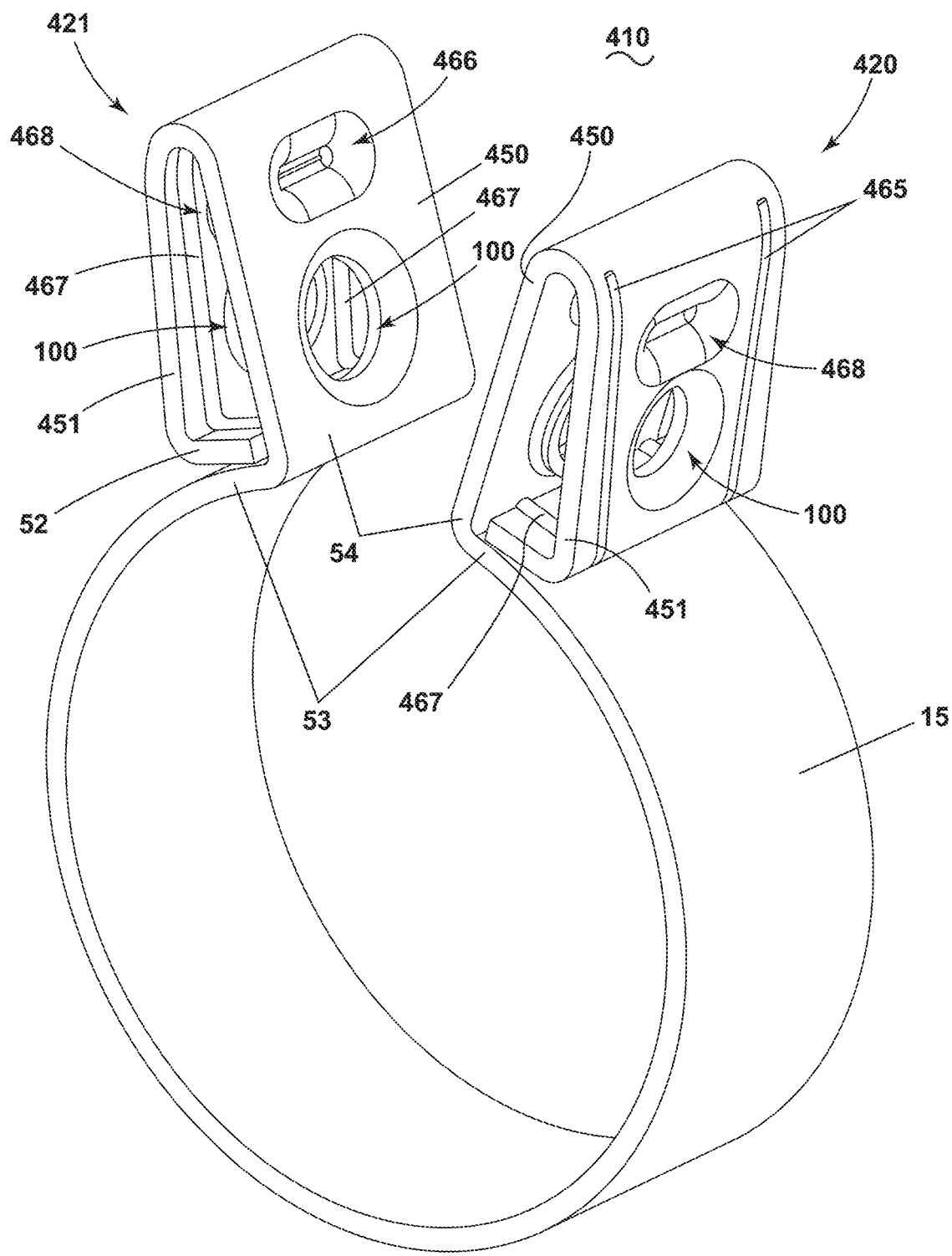
FIG. 12 is an isometric view of the set of straps of FIG. 11, in accordance with aspects described herein.

FIG. 12 illustrates an isometric view of the clamp 410, better showing the embossments 467. As shown, a set of embossments 467 can extend along at least a portion of the ear 451, a portion of the abutment ends 452, or a combination thereof. The embossments 467 can further be disposed offset of, or not aligned with the apertures 100, the first knuckles 466, the ear knuckles 488, or a combination thereof. In this sense, the set of embossments 467 can continuously extend along at least a portion of the ears 451. The isometric view further illustrates a non-limiting aspect of the disclosure wherein the embossments 467 can be formed from deformations in at least one of the ear 451 or the abutment ends 452. As shown, the deformation of at least one of the ear 451 or abutment ends 452 causing the embossments 467 can correspondingly cause a matching set of depressions 465 on the opposing side of the ear 451 or abutment ends 452.

The embossment 467, the depressions 465, or a combination thereof, can be included to provide additional or increased structural support or rigidity along the ear 451 of the clamp 410. Additionally, the embossment 467, the depressions 465, or a combination thereof, can be included to provide additional or increased structural support or rigidity along the abutment ends 452 of the clamp 410.

Figure 13:
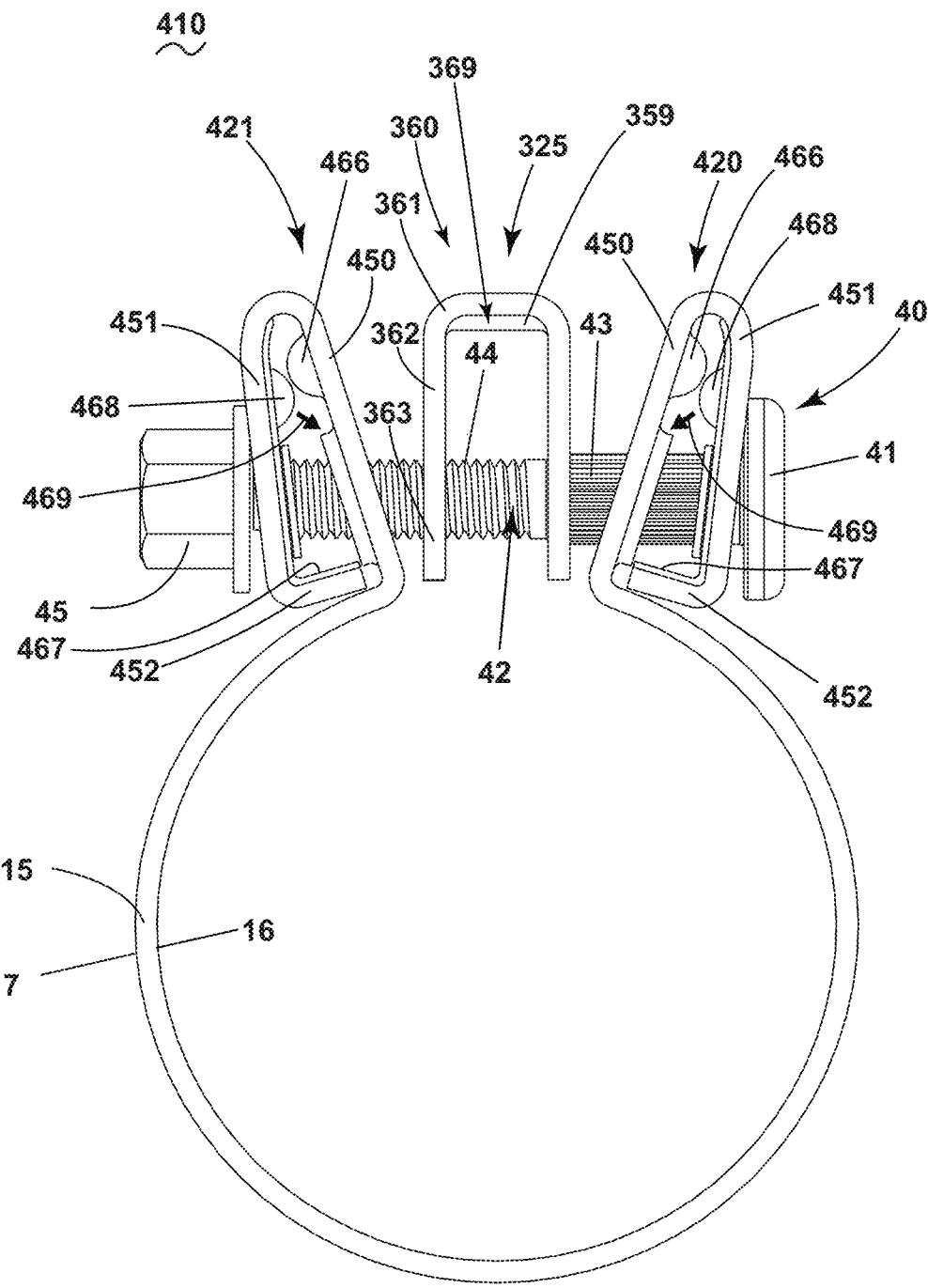
FIG. 13 is a side view of assembling the clamp of FIGS. 11-12 with the U-shaped wedge of FIGS. 10A-10B, in accordance with aspects described herein.

FIG. 13 illustrates one non-limiting aspect of assembling the wedge shaped spacer 325 of FIGS. 10A and 10B with the clamp 410 of FIGS. 11 and 12. As shown, the wedge shaped spacer 325 can be received between the first and second straps 420, 421 of the clamp 410, and tightened by way of a nut 45 and bolt 40, as explained herein. During the tightening process, the compressive force experienced by each of the first and second straps 420, 421 draws the ear 451 and tab 450 toward each other. As the ear 451 and tab 450 approach each other, the second knuckle 468 and first knuckle 466 will contact each other, and the interaction between the first and second knuckles 468, 466, in response to the compressive force, can urge, direct, redirect, or angle the second knuckle 468 or the ear 451 lower relative to the first knuckle 466. Again, "lower" as used refers to closer to the abutment ends 452, the pinch point 53, or the curved transition 53, relative to the first knuckle 466. Thus, as the ear 451 is drawn toward the tab 450 by the compressive force, the second knuckle 468 and ear 451 are urged or forced lower or downward, such as indicated by arrows 469. In another non-limiting aspect, the compressive force can include transferring the compressive force from at least one ear 450, 451 to the web 361 from which the arms 361 extend from. In one non-limiting aspect, the movement of the ear 451 in the direction of arrow 469, relative to the tab 450, can enable, operably effect, urge, or ensure the abutment end 452 of the ear 451 engages the clamp ring 15, and is directed to space between the tab skirt 70 and the pinch point 53, or between the tab skirt 70 and the curved transition 54.

Also during the tightening process described herein, the ears 451 are operably drawn toward the tabs 450. The drawing of the ears 451 and tabs 450 can cause deformations to occur in at least the ears 451, wherein the ears 451 can bend, buckle, or deform inward, that is, toward the tab 450. The inclusion of the embossments 467, the depressions 465, or a combination thereof, extending along at least a portion of the ear 451 can ensure, enable, or operably resist the deformation of the ear 451 during the tightening process.

In yet another aspect of the tightening process, the abutment ends 452 are operably compressed toward the tabs 450, between the tab skirt 70 and the pinch point 53, or between the tab skirt 70 and the curved transition 54. The compression in the direction of the length of the abutment ends 452 can cause deformations to occur wherein the abutment ends 452 bend, break, or buckle in response to the tightening process. The inclusion of the embossments 467, the depressions 465, or a combination thereof, extending in the direction of the compressive force can ensure, enable, or operably effect the compression of the abutment ends 452 without bending, buckling, or deformation, of the abutment ends 452. In another or alternative aspect, inclusion of the embossments 467, the depressions 465, or a combination thereof, extending in the direction of the compressive force can ensure, enable, or operably effect the compression of the abutment ends 452 with less bending, buckling, or deformation, of the abutment ends 452, compared with corresponding deformation of abutment ends 452 without the embossments 467 or depressions 465. Thus, aspects of the disclosure can be included wherein the set of embossments 467, set of depressions 465, or combination thereof ensures resists compressive or deformation in response to the tightening process.

In yet another aspect of the tightening process described herein, the tabs 50 operably compress the arms 362 of the U-shaped spring 360. The web 361 can be exposed to this compressive force as well, during the tightening process. The inclusion of the embossment 364 extending in the direction of, or substantially in the direction of, the compressive force can ensure, enable, or operably effect the compression of the arms 362 without bending, buckling, or deformation, of the web 361. Thus, aspects of the disclosure can be included wherein the embossment 364 ensures expected deformation of the arms 362 of the U-shaped spring 360, while providing compressive or deformation resistance at the web 361, against the tabs 50.

Figure 14A:
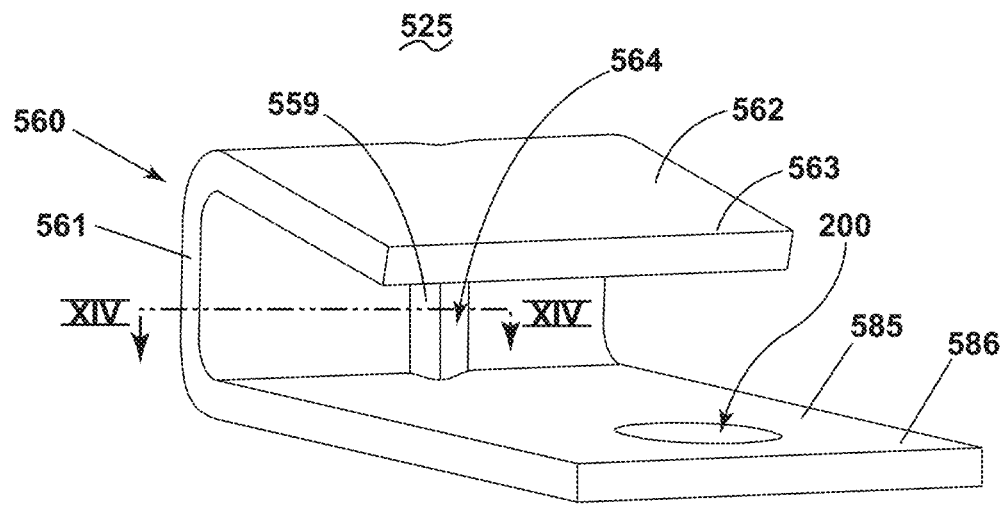
FIGS. 14A-14B are additional views of a U-shaped wedge in accordance with aspects described herein.

FIG. 14A illustrates another wedge shaped spacer 525 according to another aspect of the present disclosure. The wedge shaped spacer 525 is similar to the wedge shaped spacer 25, 324; therefore, like parts will be identified with like numerals starting with 500, with it being understood that the description of the like parts of the wedge shaped spacer 25, 325 applies to the wedge shaped spacer 525, unless otherwise noted. One difference between the wedge shaped spacer 325 and the wedge shaped spacer 525 is that the wedge shaped space 525 includes a first arm 562 having a first distal end 563 extending away from the web 561 and a second arm 585, having a distal end 586 extending away from the web 561. As shown, the second arm 585 extends away from the web 561 farther than the first arm 562. Stated another way, the first arm 562 is shorter than the second arm 585. The wedge shaped spacer 525 can further include the U-shaped spring 560 having an embossment 564 extending along the web 561. As illustrated, the embossment 564 can include a body 559 that extends toward the distal ends 563, 586 of the U-shaped spring 560.

Figure 14B:
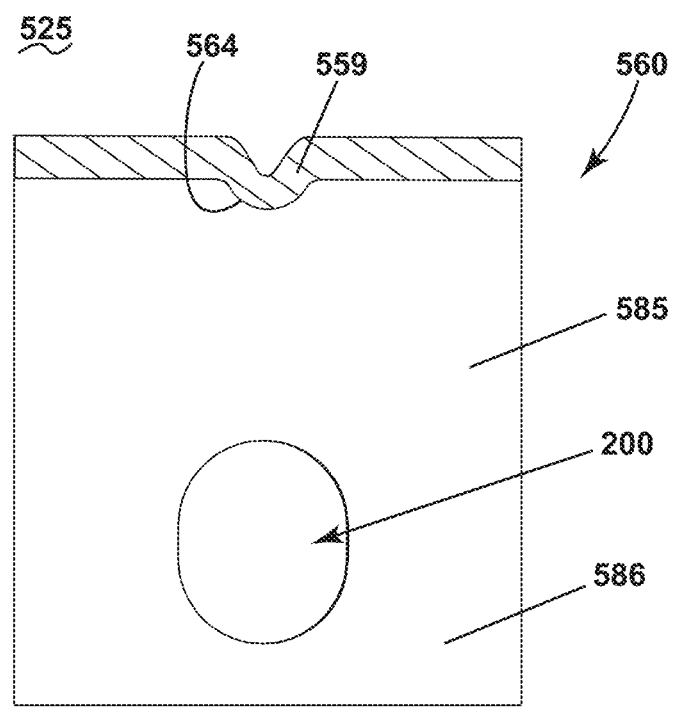

FIG. 14B illustrates a cross section of the wedge shaped spacer 525 taken along line XIVB of FIG. 14A. As shown, the embossment 564 can include or be formed, molded, machined, or the like, by way of a depression in the web 561. Aspects of the disclosure can be included wherein the embossment 564 extends along a portion of, or the full length of the web 561. The embossment 564 can be included to provide additional or increased structural support or rigidity along the web 561 of the U-shaped spring 560, that is, in the direction of the view of FIG. 14B.

Figure 15:
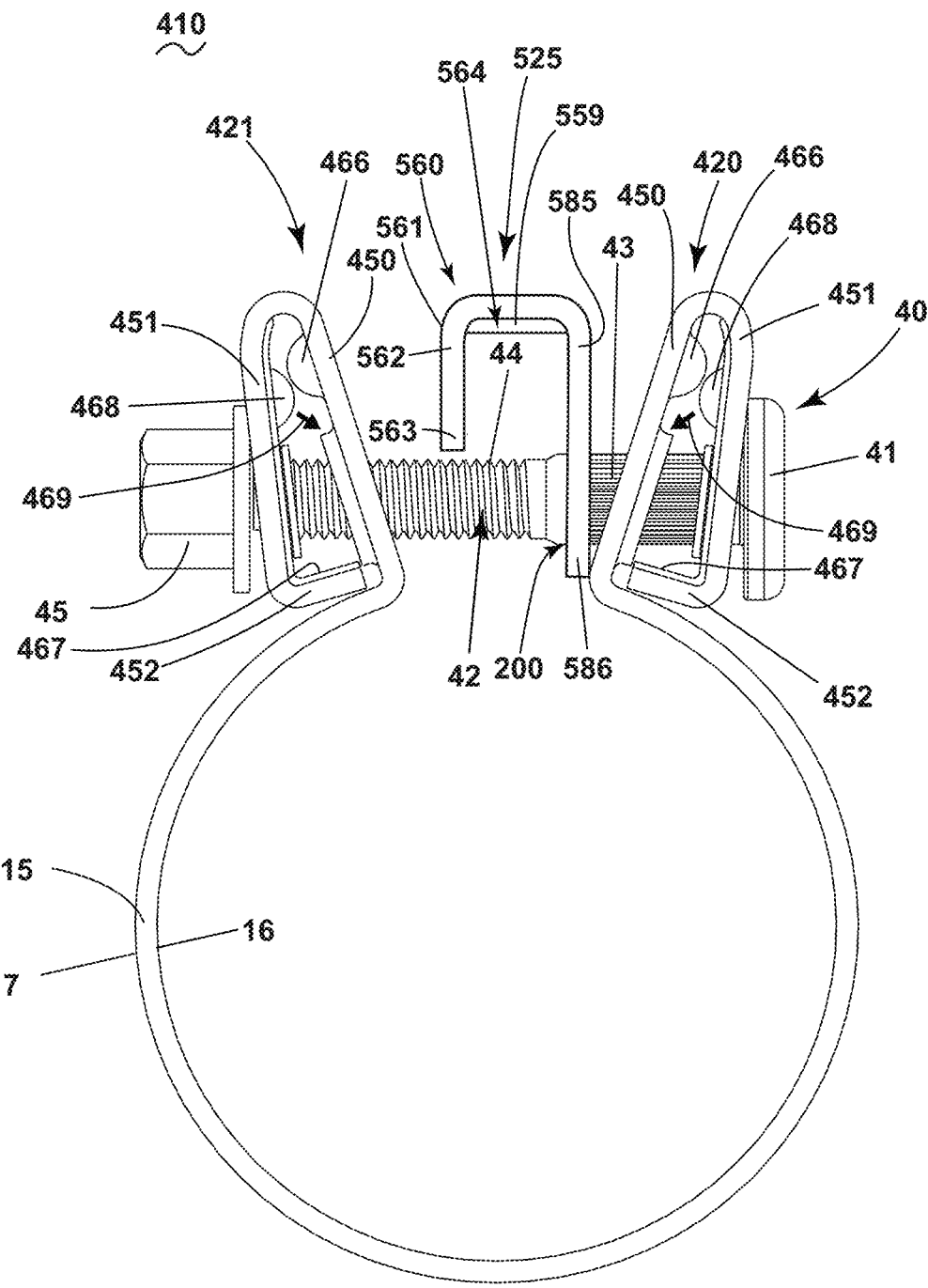
FIG. 15 is a side view of assembling the clamp of FIGS. 11-12 with the U-shaped wedge of FIGS. 14A-14B, in accordance with aspects described herein.

FIG. 15 illustrates one non-limiting aspect of assembling the wedge shaped spacer 525 of FIGS. 14A and 14B with the clamp 410 of FIGS. 11 and 12. As shown, the wedge shaped spacer 525 can be received between the first and second straps 420, 421 of the clamp 410, and tightened by way of a nut 45 and bolt 40, as explained herein. In one non-limiting aspect of the disclosure, the first arm 562 can be sized, arranged, configured, or the like, such that the distal end 563 does not extend away from the web 561 to meet the bolt 40 or shank 42. In another non-limiting aspect of the disclosure, the first arm 562 can be sized, arranged, configured, or the like, such that the distal end 563 does not extend away from the web 561 to align with or terminate at a distance aligned with the abutment ends 452. Non-limiting aspects of the disclosure can further be included wherein the first arm 562 can be sized, arranged, configured, or the like, such that the distal end 563 extends away farther from the web 561 than illustrated, but is still shorter relative to the second arm 585. For example, the first arm 562 can optionally include an aperture 200, or a partial aperture 200 configuration or cut out, in aspects where it extends past a meeting of the bolt 40 or shank 42.

Figure 16:
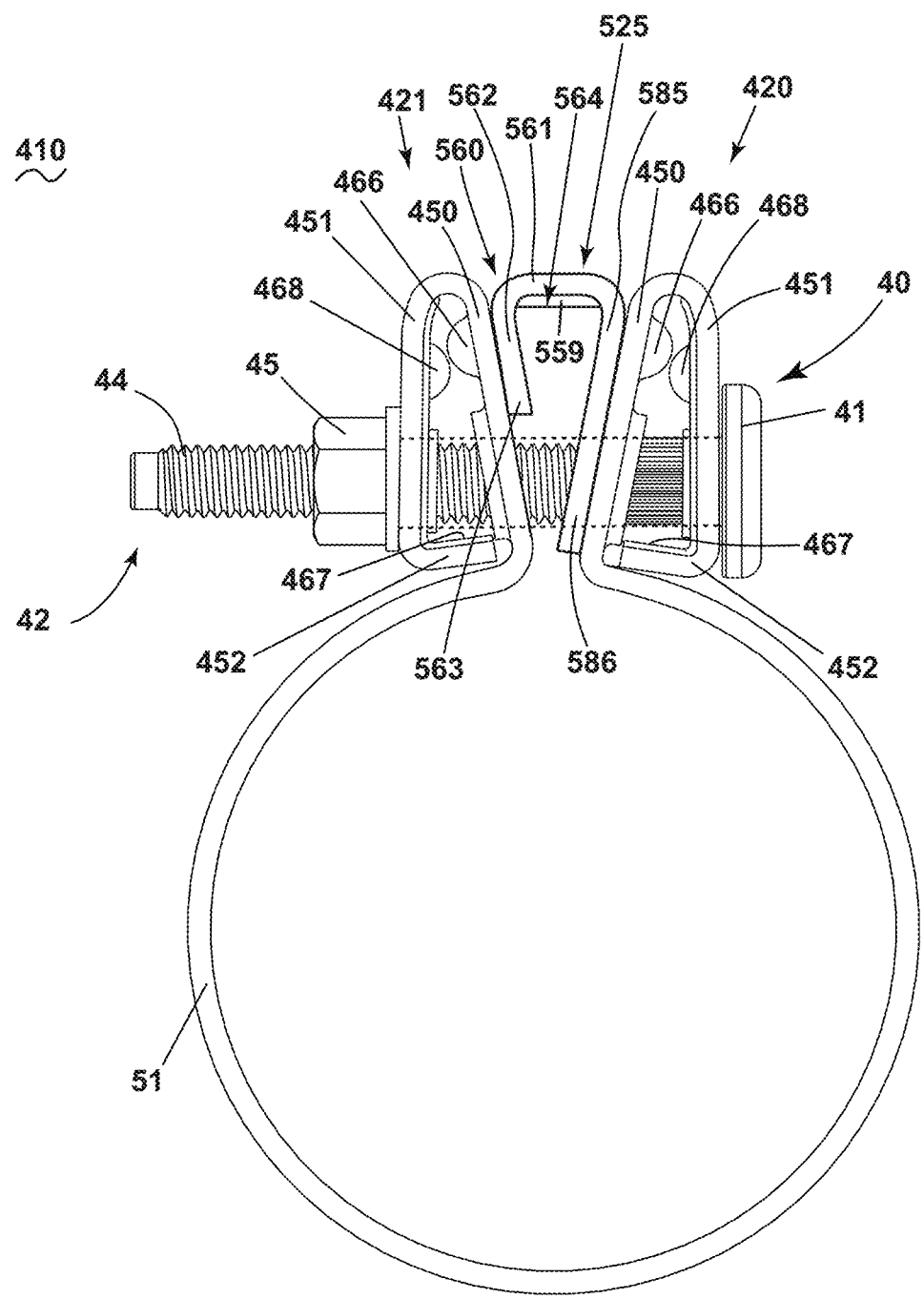
FIG. 16 is a side view of the clamp of FIG. 15 in its closed state, in accordance with aspects described herein.

During the tightening process, the compressive force experienced by each of the first and second straps 420, 421 draws the ear 451 and tab 450 toward each other, as explained herein, and as illustrated in FIG. 16. During the tightening process, the tabs 450 operably compress the arms 562, 585 of the wedge shaped spacer 525. The web 561 can be exposed to this compressive force as well, during the tightening process. The inclusion of the embossment 564 extending in the direction of, or substantially in the direction of, the compressive force can ensure, enable, or operably effect the compression of the arms 562, 585 without bending, buckling, or deformation, of the web 561. Thus, aspects of the disclosure can be included wherein the embossment 564 ensures expected deformation of the arms 562, 585 of the wedge shaped spacer 525, while providing compressive or deformation resistance at the web 561, against the tabs 450.

The tightening process can be applied or continued until each of the tabs 450 are received by a surface of the distal end 586 of the second arm 585, as shown. In this sense, the compression against the first arm 562 and the second arm 585 can deform each respective arm 562, 585 along the axial direction of the bolt 40 or shank 42 up to, or until the abutment ends 452, pinch points 453, curved transitions 454, or a similar or proximate portion of the straps 420, 421, tabs 450, or the like, contact, abut, or are compressed against the second arm 585 or the distal end 586 of the second arm 585. The arrangement of the relative shortness of the first arm 562, or that the first distal end does not extend as far as the second distal end 586 (e.g. within the compression pathway of the abutment ends 452, pinch points 453, curved transitions 454, or a similar or proximate portion of the straps 420, 421, tabs 450, or the like) allows for, enables, or provides for a tightening process that can compress or tighten further, compared with the earlier-described aspects of the disclosure having matching or evenly-extending distal ends 63, 363, or where multiple distal ends 63, 363 are in the aforementioned compression pathway. Stated another way, the first arm 562 and first distal end 563 are arranged, configured, disposed, or the like, such that the first arm 562 and first distal end 563 can provide or enable the benefits such as structural rigidity of the U-shaped spring 560, the body 559, or the like, described herein, while not interrupting or impeding the tightening process or compression relative to the second arm 585 or second distal end 586.

While the clamps of FIGS. 11 and 12 are illustrated, aspects of the disclosure can be included wherein the wedge shaped spacer 525 of FIGS. 14A and 14B can be include with any clamps, including the clamps 10 described herein.

For all embodiments described herein, it should be understood that the nut and bolt can bear against either of the first or second compression members. It is also contemplated that any or all of the first and second compression members, the center wedge, and the U-shaped spring can be formed of an incompressible material such as steel. Further, while the clamps are shown as generally circular in cross-section, other cross-sectional geometries can be contemplated.

Many other possible embodiments and configurations in addition to that shown in the above figures are contemplated by the present disclosure. For instance, the aspects of the wedge shaped spacer of FIGS. 10A-10B or 14A-14B can be combined with any of the clamps described herein. Likewise, aspects of the clamp of FIGS. 11-12 can be combined with any of the other aspects described herein. To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A clamp for compressing a junction of a first conduit and a second conduit to seal the junction, the clamp comprising:

a ring sector and a radially projecting channel sector;

the radially projecting channel sector having first and second straps, each of the first and second straps extending outwardly from the ring sector at an angle defining a pinch point, and defining a proximal gap between the pinch points less than a distal gap between ends of the first and second straps;

a wedge shaped spacer between the first and second straps, the wedge shaped spacer having a first arm and a second arm extending from a web, wherein the second arm extends further from the web than the first arm;

first and second compression members adjacent to and opposite the first and second straps from the wedge shaped spacer, each compression member having a tab with a first knuckle and an overlapping ear with a second knuckle, the first and second knuckles at least partially aligned, and each ear having a portion thereof disposed at a pinch point;

each of the first and second compression members, the first and second straps, and the second arm having an aperture in registry with each other;

a bolt extending through the apertures and having a head bearing against one of the first and second compression members; and a nut on the bolt and bearing against the other of the first and second compression members;

wherein when the nut is tightened on the bolt with the ring sector around a junction of a first outer conduit and a second conduit, the first and second compression members will be drawn toward each other such that the drawing of the first knuckles toward the second knuckles urges the pinch points toward each other thereby drawing the ring sector around the first and second conduits in compression.

2. The clamp of claim 1 wherein the tabs are arranged proximate to the wedge, and the overlapping ears are arranged overlapping the tab opposite the wedge.

3. The clamp of claim 2 wherein the first and second knuckles are radially offset such that the tightening of the nut on the bolt transfers force to the web from which the first and the second arms extend, urging the second knuckles radially inward.

4. The clamp of claim 3 wherein each of the first and second compression members is an extension of the respective first and second straps.

5. The clamp of claim 4 wherein each extension has an abutment end that bears against the pinch point, and wherein the tightening of the nut on the bolt urges the abutment ends toward the pinch point.

6. The clamp of claim 5 wherein each of the abutment ends includes an embossment.

7. The clamp of claim 6 wherein the embossment is configured to resist at least one of a bending, a buckling, or a deforming of the abutment end, in response to the tightening of the nut on the bolt.

8. The clamp of claim 1 wherein each overlapping ear includes an embossment.

9. The clamp of claim 8 wherein the embossment extends along the entire length of each ear.

10. The clamp of claim 8 wherein the embossment is configured to resist at least one of a bending, a buckling, or a deforming of each ear, in response to the tightening of the nut on the bolt.

11. The clamp of claim 1 wherein the wedge shaped spacer is a U-shaped spacer between the first and second straps and having the spaced first arm and the second arm extending from the web, wherein the web includes an embossment, and wherein the web is disposed opposite the bolt from the proximal gap and the spaced arms bear against the first and second straps.

12. The clamp of claim 11 wherein the embossment is configured to resist at least one of a bending, a buckling, or a deforming of the web, in response to the tightening of the nut on the bolt.

* * * * *